US012220672B2

(12) United States Patent
Yada et al.

(10) Patent No.: US 12,220,672 B2
(45) Date of Patent: Feb. 11, 2025

(54) LIQUID MATERIAL VAPORIZING DEVICE

(71) Applicant: HORIBA STEC, Co., Ltd., Kyoto (JP)

(72) Inventors: Hidetaka Yada, Kyoto (JP); Soichiro Hirai, Kyoto (JP); Akira Matsuura, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 400 days.

(21) Appl. No.: 17/931,776

(22) Filed: Sep. 13, 2022

(65) Prior Publication Data

US 2023/0087193 A1 Mar. 23, 2023

(30) Foreign Application Priority Data

Sep. 22, 2021 (JP) ................................ 2021-153911

(51) Int. Cl.

| | |
|---|---|
| ***B01F 23/23*** | (2022.01) |
| ***B01F 23/21*** | (2022.01) |
| ***B01F 23/80*** | (2022.01) |
| ***B01F 35/90*** | (2022.01) |

(52) U.S. Cl.

CPC .......... *B01F 23/806* (2022.01); *B01F 23/211* (2022.01); *B01F 23/23* (2022.01); *B01F 35/90* (2022.01); *B01F 2035/99* (2022.01)

(58) Field of Classification Search

CPC ....... B01F 23/211; B01F 23/23; B01F 23/806

See application file for complete search history.

(56) References Cited

U.S. PATENT DOCUMENTS 6,827,046 B2 * 12/2004 Welle .................... B01D 3/346 122/367.1

FOREIGN PATENT DOCUMENTS

JP 2004031441 A * 1/2004
JP 2017104815 A 6/2017

* cited by examiner

*Primary Examiner* — Robert A Hopkins

(74) *Attorney, Agent, or Firm* — Alleman Hall & Tuttle LLP

(57) ABSTRACT

The present invention is a liquid material vaporizing device that heats a liquid material supplying pipe without providing a heating mechanism, the liquid material vaporizing device including: a gas-liquid mixer unit configured to mix a liquid material and a gas to generate a gas-liquid mixture; a liquid material supplying pipe configured to supply the liquid material to the gas-liquid mixer unit; a vaporizer unit configured to heat the gas-liquid mixture to vaporize the liquid material; and a casing configured to house the gas-liquid mixer unit, the vaporizer unit, and the liquid material supplying pipe, in which a channel configured to guide convection of heat from the vaporizer unit to the liquid material supplying pipe is provided inside the casing.

6 Claims, 4 Drawing Sheets

LIQUID MATERIAL VAPORIZING DEVICE

BACKGROUND

Technical Field

The present invention relates to a liquid material vaporizing device.

Related Art

Having been come up with as a conventional liquid material vaporizing device is a device that mixes a liquid material and a carrier gas to generate a gas-liquid mixture in a gas-liquid mixer unit, and vaporizes the liquid material by introducing the gas-liquid mixture into a vaporizer unit, as disclosed in JP 2017-104815 A.

PRIOR ART DOCUMENT

Patent Document

JP 2017-104815 A

SUMMARY

Such a liquid material vaporizing device includes not only a vaporizer unit heating mechanism for heating the vaporizer unit, but also a supplying pipe heating mechanism for heating a liquid material supplying pipe via which the liquid material is supplied to the gas-liquid mixer unit, as illustrated in FIG. 4. The supplying pipe heating mechanism includes a heating block provided in a manner surrounding the liquid material supplying pipe, and heats the liquid material supplying pipe using a built-in cartridge heater in the heating block, for example.

The supplying pipe heating mechanism sometimes checks whether the liquid material is in the liquid material supplying pipe by heating the liquid material supplying pipe to a predetermined temperature (for example, about 60° C.), and detecting whether the pressure in the liquid material supplying pipe is at a vapor pressure of the liquid material. In addition, by heating the liquid material supplying pipe, highly viscous liquid material is heated and made less viscous so that the liquid material can be easily introduced into the gas-liquid mixer unit.

However, when the liquid material supplying pipe heating mechanism is provided, not only the number of components is increased, but also greater power is consumed. Furthermore, by providing the liquid material supplying pipe heating mechanism, the footprint of the liquid material vaporizing device also becomes increased.

The present invention has been made in view of the problems described above, and a main object of the present invention is to heat a liquid material supplying pipe without providing a heating mechanism in a liquid material vaporizing device.

In other words, a liquid material vaporizing device according to the present invention includes: a gas-liquid mixer unit configured to mix a liquid material and a gas to generate a gas-liquid mixture; a liquid material supplying pipe configured to supply the liquid material to the gas-liquid mixer unit; a vaporizer unit configured to heat the gas-liquid mixture to vaporize the liquid material; and a casing configured to house the gas-liquid mixer unit, the vaporizer unit, and the liquid material supplying pipe, in which a channel configured to guide convection of heat from the vaporizer unit to the liquid material supplying pipe is provided inside the casing.

In such a liquid material vaporizing device, because the channel leading the convection of the heat from the vaporizer unit to the liquid material supplying pipe is provided internal of the casing, it is possible to heat the liquid material supplying pipe with the convection of heat from the vaporizer unit. In this manner, it is possible to render the supplying pipe heating mechanism for heating the liquid material supplying pipe unnecessary. As a result, it becomes possible to alleviate environmental burden by reducing the number of components, and to reduce the power consumption. It also becomes possible to make the footprint of the liquid material vaporizing device smaller.

In order to facilitate guiding of the convection of heat from the vaporizer unit to the liquid material supplying pipe that is connected to the gas-liquid mixer unit, the gas-liquid mixer unit is preferably provided above the vaporizer unit inside the casing.

indicator light Specifically, inside the casing, the liquid material supplying pipe is preferably provided above the vaporizer unit.

In the conventional liquid material vaporizing device, because the gas-liquid mixer unit becomes heated by the transfer of heat (convection of heat) from the vaporizer unit, disadvantageously, the liquid material becomes thermally decomposed or deteriorates depending on the type of the liquid material. Therefore, conventionally, a cooling mechanism is provided to cool the gas-liquid mixer unit by blowing gas or the like to the gas-liquid mixer unit. In order to prevent the gas-liquid mixer unit from being highly heated by the convection of heat from the vaporizer unit, while eliminating the need for the cooling mechanism, it is desirable to provide a partition providing partitioning between the gas-liquid mixer unit and the vaporizer unit. Specifically, it is desirable that an internal space of the casing is divided into two housing spaces, the gas-liquid mixer unit is housed in one of the housing spaces, and the vaporizer unit and the liquid material supplying pipe are housed in another housing space.

In the configuration in which the gas-liquid mixer unit is provided above the vaporizer unit, in order for the gas-liquid mixer unit to become less heated by the convection of heat from the vaporizer unit, and to allow the convection of heat from the vaporizer unit to be better guided to the liquid material supplying pipe, it is desirable to provide a partitioning wall between the gas-liquid mixer unit and the vaporizer unit, and to provide the partitioning wall with an inclined surface inclined upwards toward the liquid material supplying pipe.

In order to guide the convection of heat from the vaporizer unit to the liquid material supplying pipe efficiently, it is desirable to further include a blower fan that generates an airflow in a direction from the vaporizer unit to the liquid material supplying pipe.

According to the present invention described above, in a liquid material vaporizing device, a liquid material supplying pipe can be heated without providing the heating mechanism.

DETAILED DESCRIPTION

Figure 1:
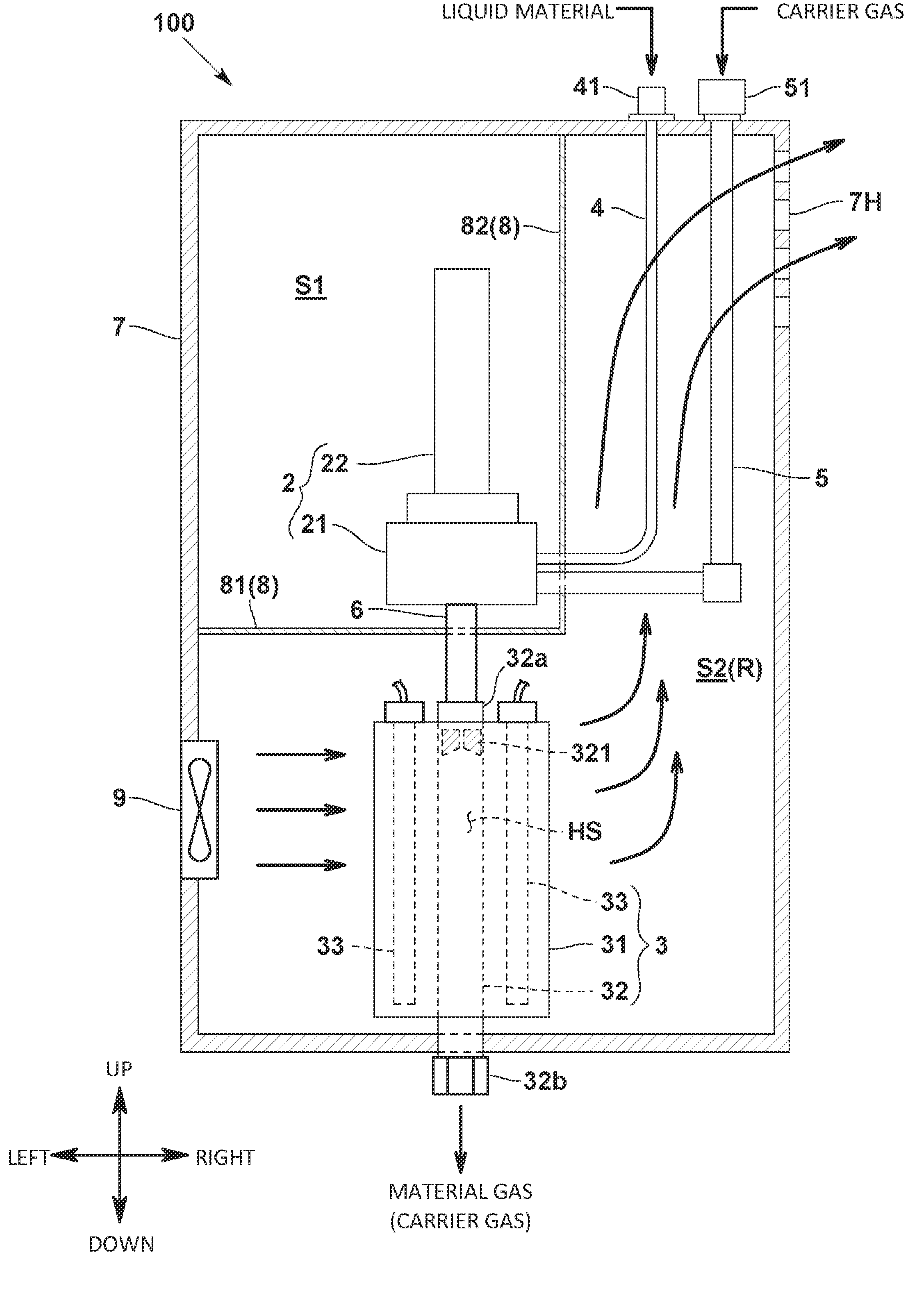
FIG. 1 is a cross-sectional view schematically illustrating a configuration of a liquid material vaporizing device according to an embodiment of the present invention.

A liquid material vaporizing device according to an embodiment of the present invention will now be explained with reference to some drawings. Note that, to facilitate understanding, all of the drawings described below are schematic representations, with some omissions and exaggerations made as appropriate. The same components are denoted by the same reference numerals, and the description thereof will be omitted as appropriate.

<Device Configuration>

The liquid material vaporizing device 100 according to the present embodiment is incorporated in, for example, an optical fiber manufacturing device, and used in an optical fiber manufacturing process. In addition, for example, it may be incorporated in a semiconductor manufacturing device, and used in a semiconductor manufacturing process.

Specifically, as illustrated in FIG. 1, the liquid material vaporizing device 100 includes a gas-liquid mixer unit 2 in which a liquid material and a carrier gas that is a gas is mixed into a gas-liquid mixture, and a vaporizer unit 3 in which the gas-liquid mixture is heated to discharge a material gas with the carrier gas by causing the liquid material to vaporize.

Examples of the liquid material includes OMCTS (octamethylcyclotetrasiloxane with a boiling point of 175° C.) and TEOS (tetraethoxysilane with a boiling point 169° C.). The liquid material may be, for example, a halogen-based liquid material, such as $SiCl_4$, conventionally used in manufacturing optical fibers, or a material used in a semiconductor process.

<Gas-Liquid Mixer Unit 2>

Figure 2:
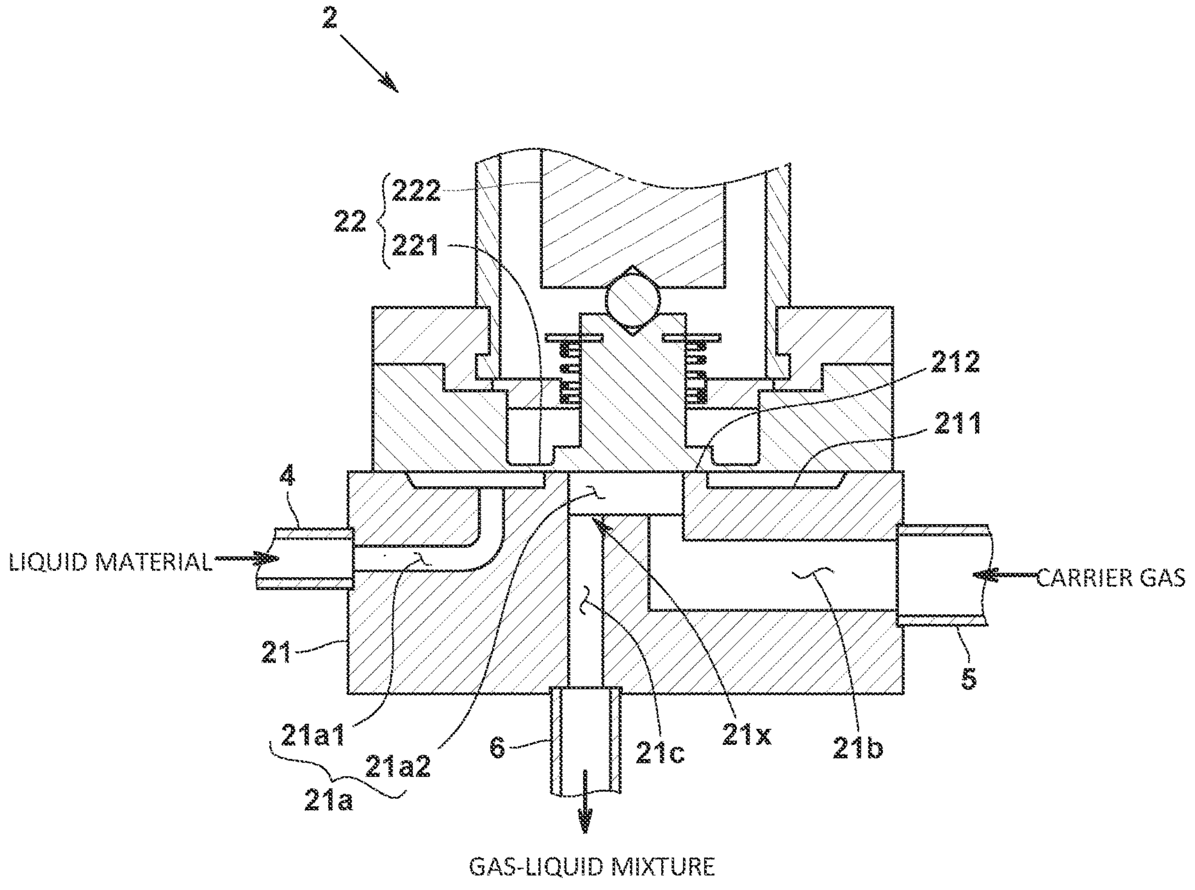
FIG. 2 is a cross-sectional view schematically illustrating a configuration of a gas-liquid mixer unit according to the embodiment.

As illustrated in FIG. 2, the gas-liquid mixer unit 2 includes a main block 21 having a mixing unit 21*x* in which a liquid material is mixed with a carrier gas, and a valve unit 22 that is provided to the main block 21 and that adjusts a flow rate of the liquid material.

As illustrated in FIG. 2, the main block 21 includes a liquid material channel 21*a* through which a liquid material flows, a carrier gas channel 21*b* through which a carrier gas flows, and a gas-liquid mixture channel 21*c* through which a gas-liquid mixture flows. A junction between the liquid material channel 21*a* and the gas-liquid mixture channel 21*c* serves as a mixing unit 21*x* for the liquid material and the carrier gas. A gas-liquid mixture channel 21*c* is connected to the mixing unit 21*x*.

In the present embodiment, the liquid material channel 21*a* is divided into an upstream portion 21*a*1 and a downstream portion 21*a*2 by the valve unit 22. A downstream opening of the upstream portion 21*a*1 opens to the bottom surface of an annular recess 211 formed on the top surface of the main block 21. An upstream opening of the downstream portion 21*a*2 opens to the central portion of the annular recess 211, and the downstream portion 21*a*2 is connected to the mixing unit 21*x*. A circumferential rim 212 of the upstream opening in the central portion of the annular recess 211 provides a valve seat (hereinafter, referred to as a valve seat 212) with and from which the valve unit 22 is brought into contact and separated.

The valve unit 22 functions as a flow control valve, and is provided on the top surface of the main block 21 with a seal member (not illustrated) therebetween, as illustrated in FIG. 2. The valve unit 22 includes a diaphragm 221 that is a valve body part brought into abutment against and separated from the valve seat 212 provided on the top surface of the main block 21, and an actuator 222 that presses the diaphragm 221 so as to cause the diaphragm 221 to deform. The actuator is, for example, an actuator using a piezo stack.

In addition, as illustrated in FIGS. 1 and 2, for example, a liquid material supplying pipe 4 for supplying the liquid material into the liquid material channel 21*a*, a carrier gas supplying pipe 5 for supplying a carrier gas into the carrier gas channel 21*b*, and a gas-liquid mixture outlet pipe 6 via which the gas-liquid mixture is discharged from the gas-liquid mixture channel 21*c* are connected to the main block 21.

On the upstream side of the liquid material supplying pipe 4, a mass flowmeter (not illustrated) for measuring a flow rate of the liquid material flowing through the liquid material supplying pipe 4 is provided. Based on the measurement of the mass flowmeter, the valve unit 22 is feedback-controlled so that the flow rate of the liquid material supplied to the mixing unit 21*x* is brought to a predetermined rate. A mass flow controller that adjusts a flow rate of the carrier gas flowing through the carrier gas supplying pipe 5 is provided upstream of the carrier gas supplying pipe 5.

<Vaporizer Unit 3>

As illustrated in FIG. 1, the vaporizer unit 3 includes a heating block 31 having a heating channel HS for heating the gas-liquid mixture generated by the gas-liquid mixer unit 2.

Specifically, the vaporizer unit 3 includes a heating pipe 32 providing a heating channel HS, and a heater 33 for heating the heating pipe 32. The heating pipe 32 and the heater 33 are internalized in the heating block 31 by covering the heating pipe 32 and the heater 33 with a heat-conducting metal (e.g., aluminum).

In the vaporizer unit 3, one end 32*a* and other end 32*b* of the heating pipe 32 configures outwards from the respective surfaces (the top surface and the bottom surface) of the heating block 31. The one end 32*a* of the heating pipe 32 is connected to the gas-liquid mixture outlet pipe 6, and the other end 32*b* of the heating pipe 32 serves as an outlet port through which the vaporized gas obtained by vaporizing the liquid material is discharged.

As illustrated in FIG. 1, in the heating pipe 32 according to the present embodiment, the one end 32*a* is provided to an upper end of the heating block 31, and the other end 32*b* is provided to a lower end of the heating block 31. A heat exchanger element 321 for increasing the area via which the heat is exchanged with the gas-liquid mixture is provided internal of the heating pipe 32. In addition, in the heating pipe 32, a nozzle 322 for injecting the gas-liquid mixture may be provided upstream of the heat exchanger element 321.

<Configuration for Utilizing Heat Convection from Vaporizer Unit 3>

The gas-liquid mixer unit 2, the vaporizer unit 3, the liquid material supplying pipe 4, the carrier gas supplying pipe 5, and the gas-liquid mixture outlet pipe 6 according to the present embodiment are housed in a casing 7 having a substantially cuboid shape. Specifically, the gas-liquid mixer unit 2 is installed so as to come to a position above the vaporizer unit 3 inside the casing 7 when the casing 7 is placed upright. The liquid material supplying pipe 4 connected to the gas-liquid mixer unit 2 is also positioned above the vaporizer unit 3, and an inlet port 41 of the liquid material supplying pipe 4 is provided on the top surface of the casing 7. The carrier gas supplying pipe 5 is also positioned above the vaporizer unit 3, and an inlet port 51 of the carrier gas supplying pipe 5 is provided on the top surface of the casing 7. In the present embodiment, "above" is a concept including not only immediately above but also including diagonally above.

A channel R via which the convection of heat from the vaporizer unit 3 is guided to the liquid material supplying pipe 4 is formed inside the casing 7. The convection of heat from vaporizer unit 3 is generated by the air around vaporizer unit 3 becoming heated by the heat radiation from the vaporizer unit 3. Specifically, the internal space of the casing 7 is divided into two housing spaces S1 and S2, the gas-liquid mixer unit 2 is housed in one housing space S1 (hereinafter, a first housing space S1), and the vaporizer unit 3 and the liquid material supplying pipe 4 are housed in the other housing space S2 (hereinafter, a second housing space S2). The second housing space S2 serves as a channel R for guiding the convection of heat from the vaporizer unit 3 to the liquid material supplying pipe 4. An exhaust port 7H is provided in an upper part of a right side wall of the casing 7, the right side wall being a wall by which the second housing space S2 is formed, and the heat convection from the vaporizer unit 3 is discharged to the external, via the exhaust port 7H.

Furthermore, the partitioning wall 8 by which the internal space of the casing 7 is divided into the two housing spaces S1 and S2 includes a first partitioning wall 81 provided between the gas-liquid mixer unit 2 and the vaporizer unit 3, and a second partitioning wall 82 provided between the gas-liquid mixer unit 2 and the liquid material supplying pipe 4. The partitioning wall 8 according to the present embodiment provides partitioning between the gas-liquid mixer unit 2 and the vaporizer unit 3, and prevents the heat from the vaporizer unit 3 from reaching the gas-liquid mixer unit 2. As illustrated in FIG. 1, the partitioning wall 8 according to the present embodiment has a substantially L-shaped cross section. The front wall, the rear wall, the top wall, and the left wall of the casing 7 together with the partitioning wall 8 form the first housing space S1, and the remaining space serves as the second housing space S2. The gas-liquid mixture outlet pipe 6 is passed through the first partitioning wall 81, and the liquid material supplying pipe 4 and the carrier gas supplying pipe 5 are passed through the second partitioning wall 82.

In addition, the casing 7 is provided with a blower fan 9 generating a flow in a direction from the vaporizer unit 3 toward the liquid material supplying pipe 4. Specifically, the blower fan 9 is provided in the second housing space S2, and FIG. 1 illustrates an example in which the blower fan 9 is provided on the left side of the vaporizer unit 3, but the position of the blower fan 9 is not limited thereto, and the blower fan 9 may be provided anywhere.

<Advantageous Effects of Present Embodiment>

In the liquid material vaporizing device 100 according to the present embodiment having the configuration described above, because the channel via which the convection of heat is guided from the vaporizer unit 3 to the liquid material supplying pipe 4 is formed inside the casing 7, the liquid material supplying pipe 4 can be heated by the convection of heat from the vaporizer unit 3. With this, it becomes possible to eliminate the need for the liquid material supplying pipe heating mechanism for heating the liquid material supplying pipe 4. As a result, it becomes possible to alleviate environmental burden by reducing the number of components, and to reduce the power consumption. It is also possible to make the footprint of the liquid material vaporizing device 100 smaller.

In the present embodiment, because the partition (partitioning wall 8) dividing the gas-liquid mixer unit 2 and the vaporizer unit 3 is provided, it is possible to prevent the gas-liquid mixer unit 2 from being highly heated by the convection of heat from the vaporizer unit 3. As a result, it is possible to prevent thermal decomposition or deterioration of the liquid material caused by the gas-liquid mixer unit 2 being heated by the convection of heat from the vaporizer unit 3.

Other Embodiments

Figure 3:
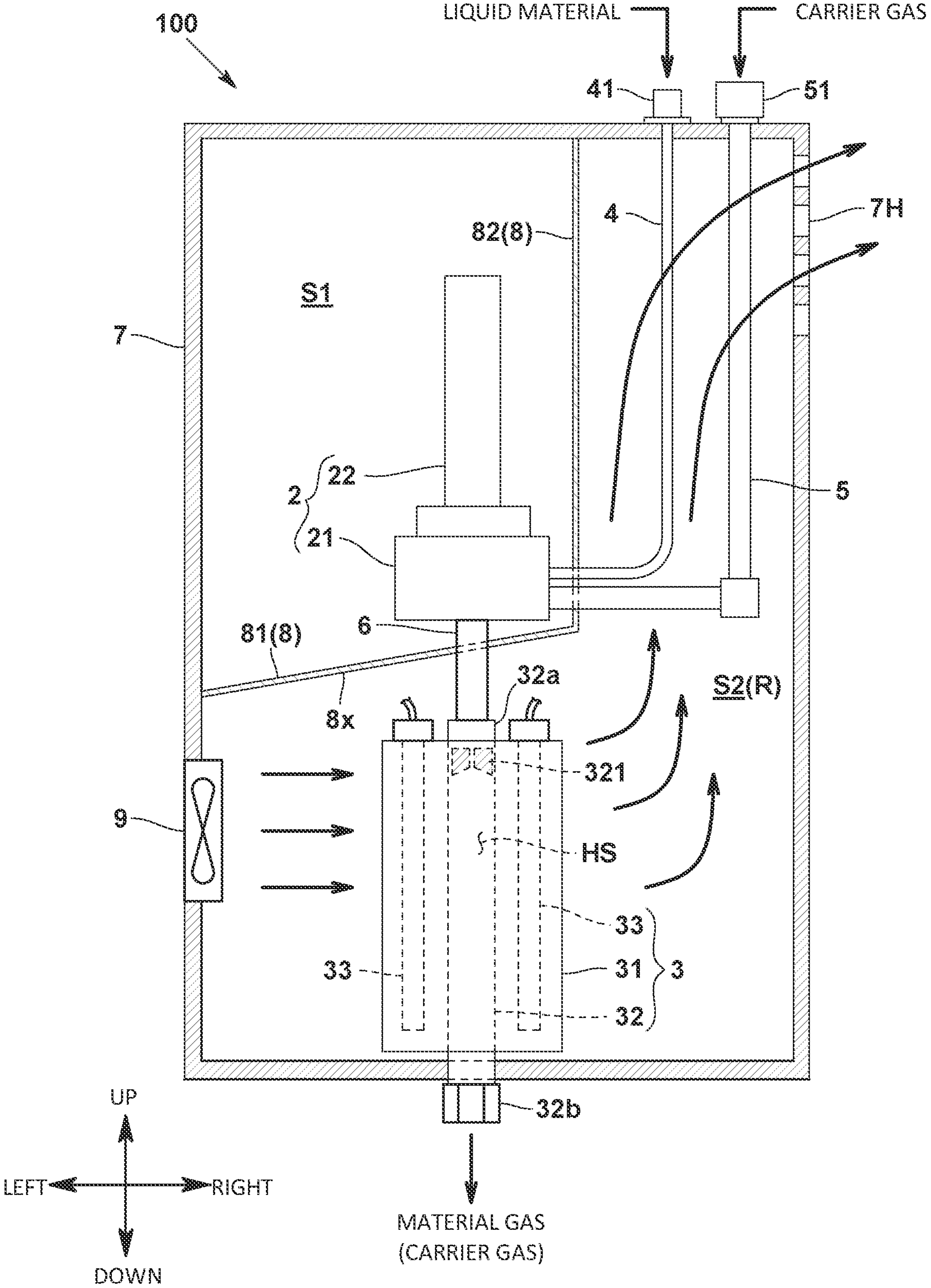
FIG. 3 is a cross-sectional view schematically illustrating a configuration of a liquid material vaporizing device according to a modification.
Figure 4:
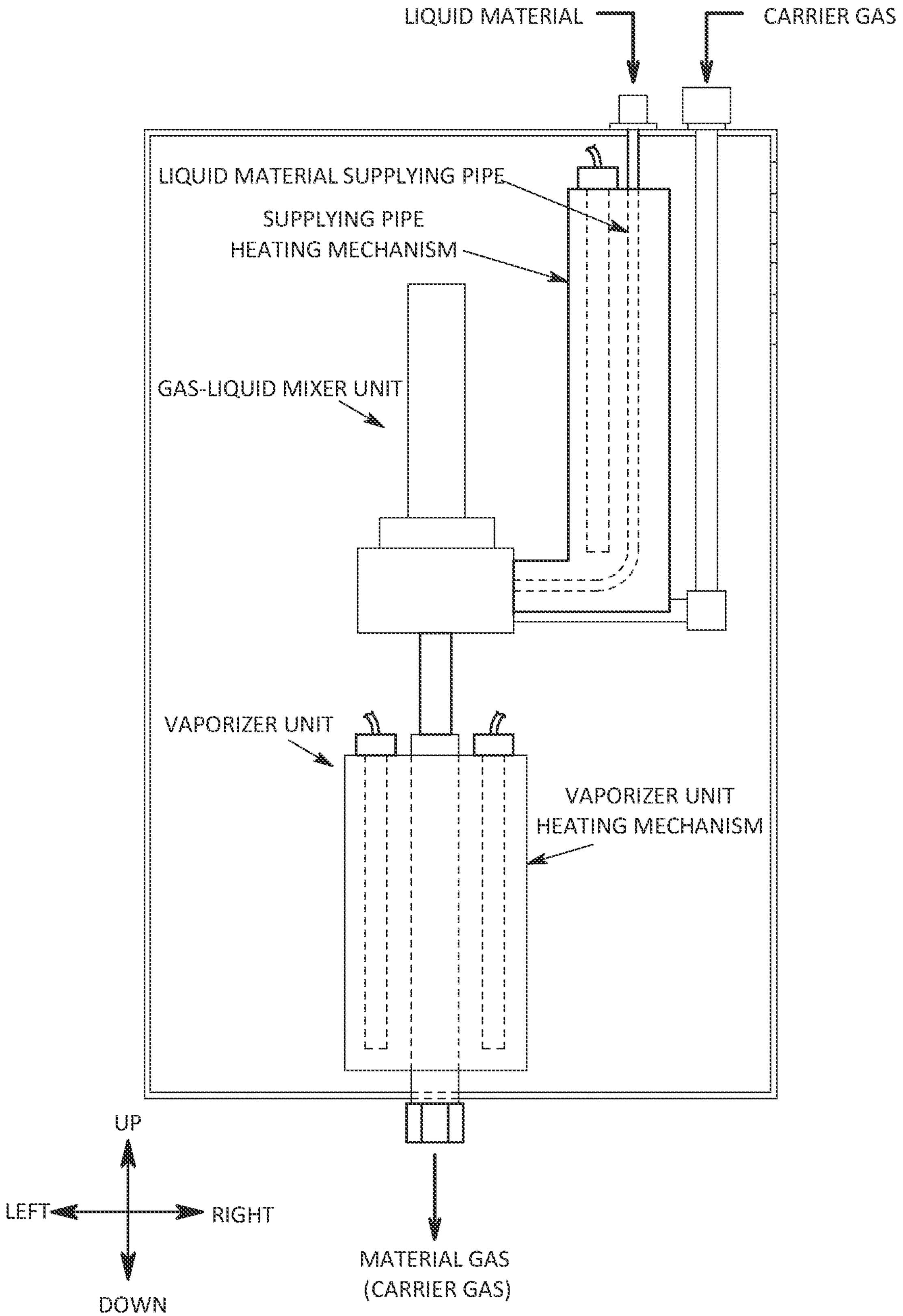
FIG. 4 is a schematic view illustrating heating mechanisms included in a conventional liquid material vaporizing device.

For example, as illustrated in FIG. 3, the partitioning wall 8 (the first partitioning wall 81) between the gas-liquid mixer unit and the vaporizer unit may have an inclined surface 8*x* inclined upwards toward the liquid material supplying pipe 4. With this configuration, it is possible to better guide the convection of heat from the vaporizer unit 3 to the liquid material supplying pipe 4.

It should be needless to say that the liquid material vaporizing device according to the embodiment described above may be used not only in an optical fiber manufacturing process and a semiconductor manufacturing process, but also in general applications requiring vaporization of other liquid materials.

As a scheme of the gas-liquid mixer unit, a scheme of spraying a liquid material into a gas using a nozzle or the like, or a scheme of vibrating a liquid with ultrasonic waves using an ultrasonic transducer or the like may be used.

In the embodiment described above, the gas-liquid mixture outlet pipe 6 has a shape of a straight pipe, but may be curved or bent depending on the arrangement of the gas-liquid mixer unit 2 and the vaporizer unit 3.

The gas-liquid mixture outlet pipe 6 according to the embodiment may also be formed integrally with the main block 21. In such a case, the gas-liquid mixture channel 21*c* of the main block 21 serves as a part of the gas-liquid mixture outlet pipe 6. In other words, a downstream portion of the mixing unit 21*x* included in the gas-liquid mixer unit 2 may be used as the gas-liquid mixture outlet pipe 6.

The liquid material according to the embodiment may include, in addition to that disclosed above in the embodiment, a liquid material achieved by dissolving a solid in a solvent or a liquid material obtained by dispersing a solid in a dispersion medium.

In addition, various modifications and combinations of the embodiments may be made within the scope not deviating from the gist of the present invention.

DESCRIPTION OF REFERENCE CHARACTERS

100 liquid material vaporizing device
2 gas-liquid mixer unit
3 vaporizer unit
4 liquid material supplying pipe
5 carrier gas supplying pipe
6 gas-liquid mixture outlet pipe
7 casing
R channel
S1 first housing space
S2 second housing space
8 partitioning wall
8*x* inclined surface
9 blower fan

What is claimed is:

1. A liquid material vaporizing device comprising:

a gas-liquid mixer unit configured to mix a liquid material and a gas to generate a gas-liquid mixture;

a liquid material supplying pipe configured to supply the liquid material to the gas-liquid mixer unit;

a vaporizer unit configured to heat the gas-liquid mixture to vaporize the liquid material; and a casing configured to house the gas-liquid mixer unit, the vaporizer unit, and the liquid material supplying pipe, wherein a channel configured to guide convection of heat from the vaporizer unit to the liquid material supplying pipe is provided inside the casing.

2. The liquid material vaporizing device according to claim 1, wherein the gas-liquid mixer unit is provided above the vaporizer unit inside the casing.

3. The liquid material vaporizing device according to claim 1, wherein the liquid material supplying pipe is provided above the vaporizer unit inside the casing.

4. The liquid material vaporizing device according to claim 1, wherein an internal space of the casing is divided into two housing spaces, the gas-liquid mixer unit is housed in one of the housing spaces, and the vaporizer unit and the liquid material supplying pipe are housed in another housing space.

5. The liquid material vaporizing device according to claim 1, wherein a partitioning wall is provided between the gas-liquid mixer unit and the vaporizer unit, and the partitioning wall has an inclined surface inclined upwards toward the liquid material supplying pipe.

6. The liquid material vaporizing device according to claim 1, further comprising a blower fan.

* * * * *